T. E. HUDSON.
FERTILIZER DISTRIBUTER.
APPLICATION FILED NOV. 17, 1911.
1,035,195.
Patented Aug. 13, 1912.
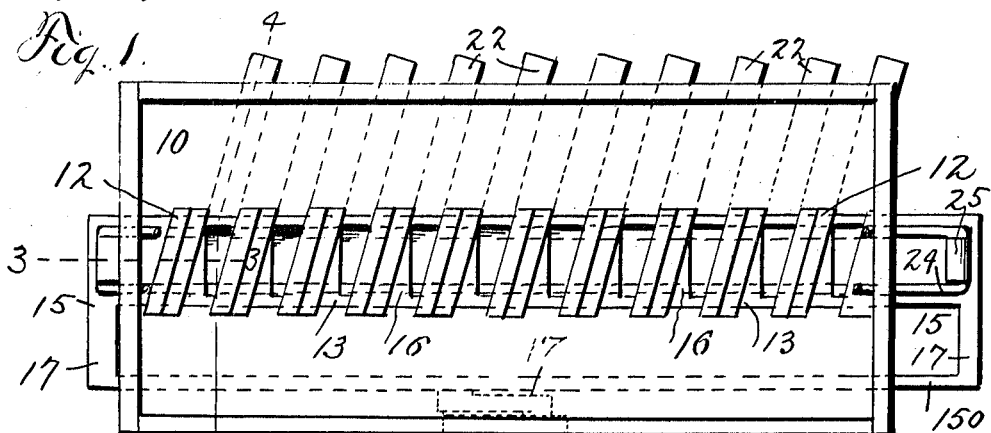
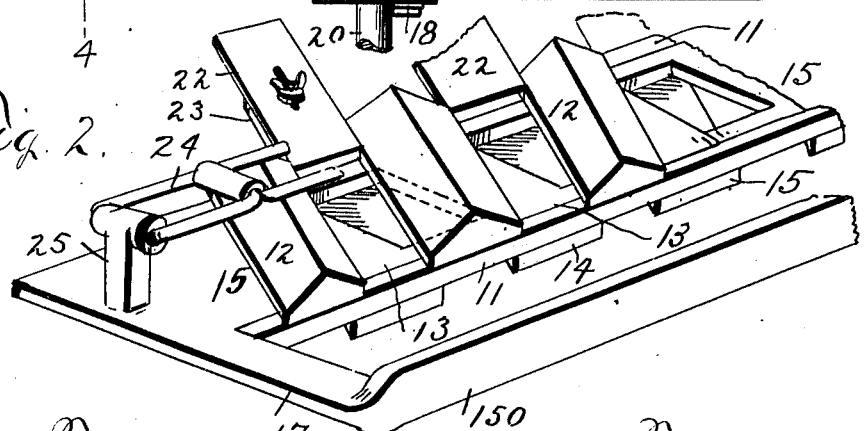
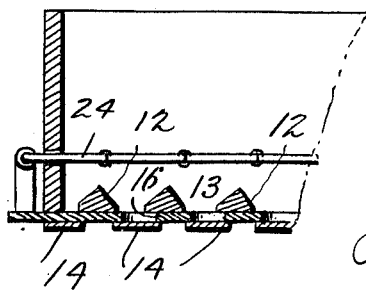
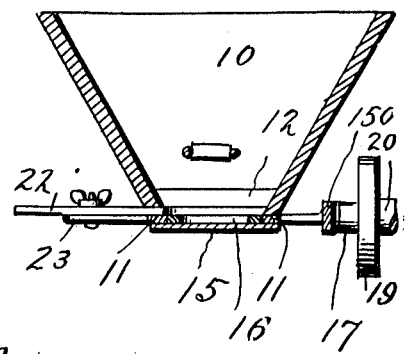
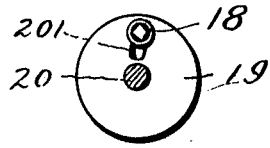
WITNESSES
K. C. Rahn
A. P. Hayes
INVENTOR
T. E. Hudson
by Chas. J. Williamson
Attorney

UNITED STATES PATENT OFFICE.

THOMAS E. HUDSON, OF NORFOLK, VIRGINIA.

FERTILIZER-DISTRIBUTER.

1,035,195.  Specification of Letters Patent.  Patented Aug. 13, 1912.

Application filed November 17, 1911. Serial No. 660,829.

*To all whom it may concern:*

Be it known that I, THOMAS E. HUDSON, of Norfolk, in the county of Norfolk and in the State of Virginia, have invented a certain new and useful Improvement in Fertilizer-Distributers, and do hereby declare that the following is a full, clear, and exact description thereof.

The object of my invention is to provide a fertilizer distributer of such construction that will be capable of wide range of adjustment as to the quantity of fertilizer distributed and capable of adjustment to sow broadcast, or in drills at various distances apart, and for side-dressing, and which, withal will be simple and efficient, and adapted to machines ranging from a wheelbarrow or hand type, to a two horse-driven type.

In the accompanying drawings—Figure 1 is a top plan view of enough of a machine to illustrate my invention, the machine being adjusted for broadcast sowing; Fig. 2 is a perspective view of a portion of the distributing devices; Fig. 3 is a longitudinal section on the line 3—3 of Fig. 1; Fig. 4 is a cross section on the line 4—4 of Fig. 1 and Fig. 5 is a detail view of the slide reciprocating means.

In the embodiment of my invention shown in the drawings, a hopper 10, of usual form is employed, which is mounted upon a suitable wheel-supported frame (not shown), and which has a slotted or grid-form bottom composed of parallel side bars 11, and obliquely extended cross bars 12, at the tops of the side bars, and separated by spaces 13, and obliquely extended cross bars 14, beneath the side bars, and situated opposite the spaces between the upper cross bars 12. The tops of the latter are inclined from a central point downward toward the spaces 13 upon the opposite sides of each cross bar 12, so as to cause the easy passage of fertilizer into such spaces, from which it is discharged from the machine by a horizontally reciprocating discharge or feed slide 15, that lies between the side bars 11 and the upper and lower cross bars. Said slide has a series of cross bars, 16, corresponding in number with the number of the series of upper or lower oblique cross bars, and said cross bars 16 are at right angles to the direction of movement of the slide 15, the result being that the edges of the cross bars 12 and 14 and the slide bars 16 are at an angle, and hence, a great and accurate graduation of the discharge or feeding space between the edges of the upper cross bars 12 and the edges of the slide cross bars, is possible, and the graduation of such space from nothing to the full capacity of the machine is accomplished simply by changing the stroke or throw of the slide, as hereinafter described. For reciprocating the slide 15, it may have attached to it a bar 16 located conveniently beyond the hopper 10, and parallel with the slide, and connected by a lateral extension 17, with each end thereof, to which bar, at or near mid-length is connected a pitman 17, which is also connected to the wrist pin 18 of a crank disk 19 on a shaft 20 which is suitably geared to carrying wheels of the machine. The wrist pin 18, is adjustably connected to the disk 19, and thus the throw of the slide may be adjusted.

For each space 13, I provide a closing slide 22, so that any number of said spaces, and at any distance apart, may be closed to prevent the hopper contents passing out except at the desired points, and at such points drills or spouts will be provided. It will thus be seen that the machine can be adjusted to drill where the rows are widely varying distances apart, and to side dress. For each slide a horizontal support is provided that may have the form of a lug or projection 23 from one of the side bars 11, and a bolt and slot arrangement may be used to retain the slide either in closing or opening position. The advantage of the adjustability of my machine in the particulars just mentioned, over machines that have a fixed capacity as to the spacing between rows, will be apparent.

To agitate the hopper contents so as to facilitate the feed of fertilizer therefrom, I use an agitator in the form of a piece of chain 24 that is stretched between two standards 25, at the ends of the feed slide 15 and which plays back and forth above the top cross bars 12.

To avoid breakage of the cross bars 16 of the slide 15, when there is some unusual obstruction, as in the case of hard phosphate rock, said bars may be spring supported, so as to yield under an abnormal pressure.

Having thus described my invention what I claim is—

1. In a distributing or sowing machine, the combination of a hopper, a grid having obliquely arranged bars separated by spaces, a traveling feed device moving beneath said bars and having cross bars with edges that form an angle with the edges of the grid bars, and means to cause the travel of said feed device.

2. In a distributing or sowing machine, the combination of a hopper, a grid having obliquely arranged bars separated by spaces, a traveling feed device moving beneath said bars and having cross bars with edges that form an angle with the edges of the grid bars, and means to change the stroke of said feed device.

3. In a distributing or sowing machine, the combination of a hopper, a grid having obliquely arranged bars separated by spaces, separate means for opening or closing said spaces, a traveling feed device moving beneath said bars and having cross bars with edges that form an angle with the edges of the grid bars, and means to cause the travel of said feed device.

4. In a distributing or sowing machine, the combination of a hopper, a grid having obliquely arranged bars separated by spaces, separate means for opening or closing said spaces, a traveling feed device moving beneath said bars and having cross bars with edges that form an angle with the edges of the grid bars, and means to change the stroke of said feed device.

5. In a distributing or sowing machine, the combination of a hopper, a grid having obliquely arranged bars separated by spaces, separate means for opening or closing said spaces, a traveling feed device moving beneath said bars and having cross bars with edges that form an angle with the edges of the grid bars, means to change the stroke of said feed device, and an agitator carried by said slide.

In testimony that I claim the foregoing I have hereunto set my hand.

THOMAS E. HUDSON.

Witnesses:
PERCY S. STEPHENSON,
BLANCHE M. MILLS.